United States Patent Office 2,993,864
Patented July 25, 1961

2,993,864
ETHYNYLCYCLOHEXYL COMPOUNDS AS CORROSION INHIBITORS
Roger F. Monroe and Fred J. Lowes, Midland, Mich., and Gerald L. Foster and Billy D. Oakes, Tulsa, Okla., assignors to The Dow Chemical Company, Midland, Mich., a corporation of Delaware
No Drawing. Filed Aug. 2, 1956, Ser. No. 601,639
9 Claims. (Cl. 252—148)

This invention relates to corrosion inhibitors for use in aqueous hydrochloric acid to inhibit the corrosion of iron, steel, ferrous alloys or nickel exposed to said acid.

The new corrosion inhibitors are compounds having the formula

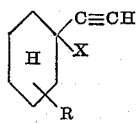

wherein R is a member of the group consisting of —H and lower alkyl radicals and X is a member of the group consisting of —OH, —SH, —NH$_2$, —Cl, —OCOCH$_3$, —OCOOC$_2$H$_5$, —OCH$_2$CH$_2$OH, —OCH$_2$CHOHCH$_3$ and PO$_3$/3. Thus, the compounds included are 1-ethynylcyclohexyl alcohol, mercaptan, amine, chloride, acetate, ethyl carbonate, 2-hydroxyethyl ether, 2-hydroxypropyl ether and phosphite and the ring-substituted lower alkyl homologs thereof wherein the alkyl group contains up to about 6 carbon atoms. This class includes several new compounds, the preparation of which is described in the copending applications of Roger F. Monroe et al., Serial No. 601,647, now Patent No. 2,802,878; Serial No. 601,650, now abandoned, Serial No. 610,655, now Patent No. 2,805,257; and Serial No. 601,656, now abandoned, all filed concurrently herewith.

According to the invention, the inhibitors are simply dissolved in the aqueous hydrochloric acid the corrosive action of which is to be inhibited. By "aqueous hydrochloric acid" we mean HCl in the presence of a significant amount of water and do not mean to exclude other substances. Only a small amount of the inhibitor is required. As little as a few thousandths of 1 percent, based on the acid solution, significantly reduces the corrosion of iron, steel and nickel exposed to the acid. The degree of inhibition increases with the concentration of the inhibitor up to a level of about 1 percent while beyond this point there is little advantage in using more inhibitor. For most applications, we prefer to use the inhibitor at a level of about 0.1 to 0.4 percent, this being adequate for most purposes.

The inhibitors of the invention are effective not only at ordinary temperatures but also at elevated temperatures up to the decomposition point of the inhibitor. This point varies somewhat, depending on the particular compound being used, but all the inhibitors are effective up to at least 150° F. and many are effective to 175°, dependent somewhat on the concentration of the acid in which they are used. They are effective in all concentrations of hydrochloric acid up to at least 37 percent, corresponding to commercial concentrated acid.

Applications in which our inhibitors are particularly effective include metal-cleaning and polishing baths, oil well-acidizing solutions, boiler-cleaning compositions and the like.

In order to demonstrate the effectiveness of our inhibitors, a series of standardized tests was run wherein 0.4 percent of the inhibitor was added to a 10 percent solution of HCl in water held at 150° F., and a coupon of AISI-1020 mild steel, previously pickled, cleaned, dried, and tared, was suspended in the acid solution. After 16 hours at 150° the coupon was removed, washed, dried and reweighed to determine the amount of metal removed during the test. This was then calculated as lbs. of metal removed per sq. ft. per day. Results of these tests are shown in Table I.

Table I

Corrosion rate of 10 percent HCl at 150° F. on mild steel in the presence of 0.4 percent of an inhibitor having the formula

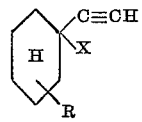

| Example No. | R | X | Corrosion Rate, lb./sq. ft./day |
|---|---|---|---|
| 1 | H | —OH | 0.0052 |
| 2 | H | —OCH$_2$CHOHCH$_3$ | .0056 |
| 3 | H | —PO$_3$/3 | .0058 |
| 4 | H | —NH$_2$ | .0059 |
| 5 | 4-Methyl | —OH | .0064 |
| 6 | 4-tert.-Butyl | —OH | .0069 |
| 7 | H | —OCOOC$_2$H$_5$ | .0089 |
| 8 | 2-Methyl | —OH | .011 |
| 9 | H | —OCH$_2$CH$_2$OH | .012 |
| 10 | H | —Cl | .016 |
| 11 | H | —OCOCH$_3$ | .015 |
| 12 | x-Methyl | —OH | .034 |
| 13 | x-Methyl | —Cl | .197 |
| 14 | H | —SH | .237 |
| 15 | (no inhibitor) | | >1. |

Homologs of the compounds in the above table wherein R is an alkyl group containing up to at least 6 carbon atoms are also effective inhibitors.

Results generally paralleling those shown in Table I were obtained when similar tests were made, using other concentrations of HCl or lower temperatures, though the use of more dilute acid or lower temperature naturally resulted in a lower corrosion rate. Likewise, the use of other metals including iron, other types of steel, including stainless, or nickel gave generally similar results, the inhibitors being effective in each case even thought the observed corrosion rates varies according to the particular type of metal used.

The compounds of Examples 1, 5, 6, 8 and 12 may be made by the procedure described in British Patent 737,080. Those of Examples 2 and 9 may be made by the reaction of the appropriate alkylene oxide with the corresponding alcohol. Those of Examples 3, 7 and 11 may be made by treating the corresponding alcohol or metal alcoholate with the appropriate acid chloride. Those of Examples 10 and 13 may be made from the corresponding alcohol by treatment with concentrated hydrochloric acid. Similarly, the compounds of Examples 4 and 14 may be made from the corresponding chlorides by reaction with concentrated NH$_4$OH or alkali metal hydrosulfide, respectively.

We claim:
1. An aqueous solution of hydrochloric acid containing, as a corrosion inhibitor therefor, about 0.1 to 1% of a compound having the formula

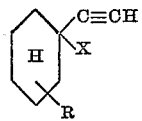

wherein R is a member of the group consisting of —H and lower alkyl radicals and X is a member of the group consisting of —OH, —SH, —NH$_2$, —Cl, —OCOCH$_3$, —OCOOC$_2$H$_5$, —OCH$_2$CH$_2$OH, —OCH$_2$CHOHCH$_3$ and —PO$_3$/3.

2. A solution as in claim 1 wherein X is —OH.
3. A solution as in claim 1 wherein X is —NH$_2$.
4. A solution as in claim 1 wherein X is —OCOC$_2$H$_5$.
5. A solution as in claim 1 wherein X is —PO$_3$/3.
6. A solution as in claim 1 wherein X is

—OCH$_2$CHOHCH$_3$

7. An aqueous solution of hydrochloric acid containing, as a corrosion inhibitor therefor, about 0.1 to 1% of 1-ethynylcyclohexanol.
8. A process for inhibiting the corrosion of a metal of the group consisting of iron, steel, nickel and ferrous alloys by aqueous hydrochloric acid in contact therewith comprising maintaining in said acid a small but effective concentration of the inhibitor defined in claim 1.
9. A process as defined in claim 8 wherein the concentration of the inhibitor is about 0.1 to 1 percent, by weight.

References Cited in the file of this patent

UNITED STATES PATENTS

| | | |
|---|---|---|
| 1,169,341 | Chrzesciuski et al. | Jan. 25, 1916 |
| 1,841,768 | Straus et al. | Jan. 19, 1932 |
| 1,963,934 | Carothers et al. | June 19, 1934 |
| 2,152,406 | Ducamp et al. | Mar. 28, 1939 |
| 2,204,597 | Humphreys et al. | June 18, 1940 |
| 2,250,445 | Bruson et al. | July 29, 1941 |
| 2,355,599 | Walker | Aug. 8, 1944 |
| 2,371,644 | Petering et al. | Mar. 20, 1945 |
| 2,407,149 | Gardenier | Sept. 3, 1946 |
| 2,603,622 | Berger et al. | July 15, 1952 |
| 2,726,269 | Humphlett | Dec. 6, 1955 |
| 2,775,624 | Skeeters et al. | Dec. 25, 1956 |
| 2,775,626 | Schaaf et al. | Dec. 25, 1956 |
| 2,805,257 | Lowes et al. | Sept. 3, 1957 |
| 2,806,067 | Monroe et al. | Sept. 10, 1957 |
| 2,814,593 | Beiswanger et al. | Nov. 26, 1957 |
| 2,838,458 | Bachtel | June 10, 1958 |
| 2,880,180 | Foster et al. | Mar. 31, 1959 |

FOREIGN PATENTS

| | | |
|---|---|---|
| 627,453 | Great Britain | Aug. 9, 1949 |
| 890,796 | Germany | Sept. 21, 1953 |
| 1,075,385 | France | Apr. 14, 1954 |
| 1,079,916 | France | May 26, 1954 |
| 505,421 | Belgium | Sept. 15, 1951 |

OTHER REFERENCES

Corrosion Handbook by Uhlig, pages 910–912, publ. by John Wiley, N.Y., 1948.